United States Patent

[11] 3,616,397

| [72] | Inventor | James E. Lohr<br>Drexel Hill, Pa. |
|---|---|---|
| [21] | Appl. No. | 864,551 |
| [22] | Filed | Oct. 7, 1969 |
| [45] | Patented | Oct. 26, 1971 |
| [73] | Assignee | E. I. du Pont de Nemours and Company<br>Wilmington, Del. |

[54] PROCESS FOR THE ELECTRODEPOSITION OF METALLIC PAINT FILMS
9 Claims, No Drawings

| [52] | U.S. Cl. | 204/181 |
|---|---|---|
| [51] | Int. Cl. | B01k 5/02,<br>C23b 13/00 |
| [50] | Field of Search | 204/181 |

[56] References Cited
UNITED STATES PATENTS

| 3,067,120 | 12/1962 | Pearlstein | 204/181 |
|---|---|---|---|
| 3,230,162 | 1/1966 | Gilchrist | 204/181 |
| 3,262,899 | 1/1968 | Gilchrist | 204/181 |

*Primary Examiner*—Howard S. Williams
*Attorney*—Hilmar L. Fricke

ABSTRACT: A process for electrocoating a film-forming polymeric composition containing metallic flake particles on the anode of an electrocoating cell is the subject of this invention; the bath utilized in the electrocoating cell comprises a uniformly dispersed film-forming organic polymer which has pendent acid groups and has an acid number of 0.5–300 and is neutralized with a water-soluble compound which is either a metal hydroxide, a water-soluble amine, a water-soluble polyamine, or a water-soluble hydroxy amine, and the bath contains pigment particles of metallic flake which are coated with a thin layer of a cross-linked polymer and have a diameter to thickness ratio of about 40:1 to 1,000:1 and the bath has a pigment to binder ratio of about 1:100 to about 10:100; methods for making the aqueous dispersions for use in the electrocoating bath are also disclosed.

PROCESS FOR THE ELECTRODEPOSITION OF METALLIC PAINT FILMS

BACKGROUND OF THE INVENTION

This invention relates to an improved electrocoating process, and in particular, to an improved electrocoating process for depositing aqueous polymeric dispersions which are pigmented with metallic flake pigment.

It is well know in the art to apply carboxylic polymer resins to metal articles as is shown in Gilchrist U.S. Pat. No. 3,230,162, issued Jan. 18, 1966 and Gilchrist U.S. Pat. No. 3,362,899, issued Jan. 9, 1968. However, these methods do not disclose the electrodeposition of an ionizable polymer blended with metallic flake pigments. There is a particular need for depositing a film-forming polymer with a metallic flake pigment to give films which have attractive and aesthetic properties which are desirable, for example, on ornamental articles. There has been a particular problem with the prior art electrocoating compositions and processes in electrodepositing compositions containing metallic flake, such as, settling of the metallic flake from the polymer dispersion, poor and uneven electrodeposition of the polymer and the metallic flake pigment corrosion of the metallic flake in electrocoating baths having a high pH and the like.

The novel process of this invention allows the deposition of ionizable polymers that are blended with metallic flake pigments onto metal articles at an even and uniform rate to give coatings of high quality and excellent appearance.

SUMMARY OF THE INVENTION

The process of this invention is an improved electrocoating process for electrodepositing a film-forming polymeric composition containing metallic flake pigments on the anode of an electrocoating cell, in which the anode consists of a metal article and is immersed in a bath containing a polymeric dispersion, direct current is passed through the cell to deposit a coating on the anode, the coated anode is removed from the bath and baked and a continuous film is formed thereon; the improvement of the process of this invention comprises the use of an electrocoating bath of an aqueous dispersion that has a polymer solids content of 2–35 percent by weight and has a pH of about 5–10 in which the dispersion comprises 1 uniformly dispersed film-forming components comprising a polymer having pendent acid groups and having an acid number of about 0.5–300; the film-forming polymer is neutralized with a water-soluble compound selected from the group consisting of metal hydroxide, a water-soluble mine, a water-soluble polyamine and a water-soluble hydroxy-amine; and 2. uniformly dispersed pigment particles of metallic flake pigment coated with a thin layer of a cross-linked polymer and having a diameter to thickness ratio of about 40:1 to 1,000:1; the pigment particles are present in the bath in a pigment to binder ratio of about 1:100 to 10:100.

DESCRIPTION OF THE INVENTION

One preferred process utilizes an aqueous electrocoating dispersion which has as the film-forming components about 95–50 percent by weight, based on the total weight of the film-forming components, of a carboxylic acid polymer that has an acid number of about 6–25 and correspondingly about 5–50 percent by weight of a water-dispersible thermosetting resin. One particularly preferred process utilizes an aqueous dispersion that has as the film-forming components about 75–90 percent by weight of the aforementioned carboxylic acid polymer that has an acid number of about 15–24 and about 5–25 percent by weight of a thermosetting nitrogen containing resin.

The term "acid number" is defined as the number of milligrams of potassium hydroxide necessary to neutralize 1 gram of polymer.

A wide variety of polymers can be used in the process of this invention as the film-forming polymer of the novel aqueous dispersion provided that the polymer contains pendent acid groups and has a molecular weight in the range of about 500–20,000. For example, alkyd resins, epoxy resins, acrylic resins, reaction products of dicarboxylic acid or an anhydride and drying oil, all may be used as the film-forming polymer of this invention. Preferably, these polymers have an acid number of about 6–25. The acid groups of a polymer may be carboxylic acid groups or mineral acid groups, such as, sulfonic acid groups or mixtures thereof.

Alkyd resins which are the polymeric esters of a polyhydric alcohol and a polybasic acid can be used as the film-forming polymer. The following conventional fatty acids are useful in forming these alkyd resins: linoleic, linolenic, eleostearic, ricinoleic and dehydrated ricinoleic. These fatty acids are derived from oils such as tung oil, linseed oil, soya oil, dehydrated castor oil, rosin-free tall oil. The acids from dehydrated castor oil and rosin-free tall oil are preferred. Other polybasic acids or anhydrides, such as phthalic maleic, sebacic and adipic acids can be used with the above fatty acid to form alkyd resins useful in this invention. Trimellitic anhydride is one of the preferred compounds.

Any of a wise variety of polyhydric alcohols can be used in forming the alkyd resins, such as glycerol, pentaerythritol, ethylene glycol, propylene glycol, diethylene glycol, 1,5-pentane diol, bisphenol A (para,para isopropylidenediphenol), hydrogenated bisphenol A (4,4-isopropylidene dicyclohexanol) bisphenol F (4,4'-dihydroxydiphenyl methane) and the like.

One preferred alkyd resin is from hydrogenated bisphenol A, dehydrated castor oil, trimellitic anhydride and 1,5-pentanediol.

Another useful film-forming material is the reaction product of the anhydride of an unsaturated aliphatic dicarboxylic acid and a conventional drying oil. Typically useful anhydrides are maleic, itaconic, and pyrocinchonic anhydrides. Any of the drying oils, such as tung, linseed oil, dehydrated castor oil, soya bean oil and the like may be used to form this film-forming polymer useful in the novel process of this invention. One preferred polymer is the reaction product of maleic anhydride and rosin-free tall oil.

Esterified epoxy resins are also useful as film-forming materials which can be used in the process of this invention. One preferred epoxy resin is an epoxy hydroxy polyether of a condensate of chlorohydrin and bis-(4-hydroxy phenol)-alkane, the chlorohydrin preferably is epichlorohydrin or glycerol chlorohydrin. These epoxy hydroxy resins can be esterified with a conventional drying oil fatty acid such as dehydrated castor oil fatty acids, linseed oil fatty acids, oiticia oil fatty acids, soya oil fatty acid, tung oil fatty acids and the like.

Acrylic polymers can also be used in the novel process of this invention. Typically, these polymers are formed by polymerizing an acrylic ester such as methyl methacrylate or ethyl acrylate with a copolymerizable $\alpha,\beta$-unsaturated carboxylic acid, such as acrylic acid or methacrylic acid. In general, the acrylic polymers have a major portion of a methacrylic acid ester and/or an acrylic acid ester in which the esters are of alcohols having one to 12 carbon atoms. The following are typically useful methacrylate esters and acrylate esters: ethyl acrylate, propyl acrylate, isopropyl acrylate, butyl acrylate, isobutyl acrylate, secondary butyl acrylate, hexyl acrylate, 2-ethylhexyl acrylate, octyl acrylate, nonylacrylate, lauryl acrylate and the like; methyl methacrylate, propyl methacrylate, isobutyl methacrylate, butyl methacrylate, secondary butyl methacrylate, tertiary butyl methacrylate, hexyl methacrylate, 2-ethylhexyl methacrylate, nonylmethacrylate and lauryl methacrylate.

Copolymerizable aromatic compounds having vinyl unsaturation such as, styrene and vinyl toluene also can be used in these acrylic polymers. Preferably, up to about 30 percent by weight of styrene can be used to form acrylic polymers useful in this invention.

Preferably, the acrylic polymers contain a hydroxy alkyl monomer such as a hydroxyalkyl methacrylate or a hydroxyalkyl acrylate or a combination thereof. These monomers preferably have an alkyl group of one to eight carbon atoms. Typically useful hydroxyalkyl monomers are, for example, hydroxyethyl methacrylate, hydroxypropyl methacrylate, hydroxybutyl methacrylate, hydroxyoctyl methacrylate, hydroxyethyl acrylate, hydroxypropyl acrylate, hydroxybutyl acrylate, hydroxyoctyl acrylate and the like. Preferred are hydroxyalkyl methacrylates and acrylates in which the alkyl group contains two to four carbon atoms.

Typically useful $\alpha,\beta$-unsaturated carboxylic acids used in forming the acrylic polymers are, for example, acrylic acid, methacrylic acid, itaconic acid and the like.

One particularly useful acrylic polymer is of 15–25 percent by weight styrene, 15–25 percent methyl methacrylate, 40–50 percent 2-ethyl-hexyl acrylate, 5–15 percent hydroxypropyl methacrylate and 1–8 percent methacrylic acid.

Polyesters can also used in the novel process of this invention which are formed from dicarboxylic acid and a polyol. Typically useful saturated aliphatic carboxylic acids or their anhydrides which can be used in forming these polyesters have two to 10 carbon atoms, such as, glutaric acid, pimelic acid, suberic acid, azelaic acid, sebacic acid and the like. The preferred acid of this group is adipic acid. Aromatic dibasic acids or their anhydrides can also be used, such as phthalic acid, isophthalic acid, terephthalic acid, uvitic acid, cuminic acid and the like. Polybasic aromatic acids or their anyhydrides, such as trimellitic acid, pyromellitic acid, benzenepentacarboxylic acid and the like can also be used.

Many polyols can be reacted with the aforementioned acids to form these polyesters. Particularly useful polyols are, for example, are ethylene glycol, diethylene glycol, propylene glycol, 1,4-butane diol and 1,5-pentane diol. Polyols which contain more than 2 hydroxy groups can also be used, such as, glycerine, pentaerythritol, trimethylolethane and trimethyolpropane.

Preferably, a thermosetting resin is used with the aforementioned polymers to form the film-forming components used in the novel process of this invention.

In general, it is preferred to use a thermosetting resin with the aforementioned polymers in the amount of about 5–50 percent by weight based on the weight of the film-forming components. A thermosetting resin can be used providing the resin is dispersible in water and compatible with the aforementioned polymer. Particularly useful resins, are, for example, phenol formaldehyde, urea/formaldehyde, melamine/formaldehyde, alkylated melamine/formaldehyde resins, benzoguanamine/formaldehyde resins and the like.

One preferred resin is an alkylated melamine/formaldehyde resin that has one to four carbon atoms in the alkyl group. These resins can be prepared by conventional techniques in which a low alkyl alcohol, such as, methanol, butanol, propanol, isopropanol, ethanol, and the like, is reacted with the melamine formaldehyde resin to provide pendent alkoxy groups. One preferred melamine resin used in this invention because of its availability and since it forms a high quality coating composition is a methylolated melamine/formaldehyde resin such as, hexamethoxymethyl melamine.

Another preferred thermosetting resin used in the novel process of this invention which gives a high quality product is tetrakisethoxybismethoxy methyl melamine which is sold under the trade name "Cymel" XM–1116.

In addition to giving the coating thermosetting properties, these resins provide corrosion resistance, hardness, solvent, alkali and heat resistance to the coating.

In forming the coating composition used in the novel process of this invention, the acid containing polymer is blended with one of the aforementioned thermosetting resins. This blend is often relatively insoluble in water and difficult to disperse. A solvent for the polymer blend which is miscible with water in amounts of about 2–10 percent based on the total weight of the polymer blend can be used to dissolve this polymer blend and aid in dispersing the blend in the aqueous bath. The following are some of the many solvents which can be used: diacetone alcohol, ethyl alcohol, methyl alcohol, ethyl cellosolve, butyl cellosolve, cyclohexanol, tetrahydrofuran, tertiary butyl alcohol, isopropyl alcohol and the like.

The metallic flake pigments used in the novel process of this invention has a diameter to thickness ratio of about 40:1 to about 1,000:1 and are coated with a thin layer of a cross-linked polymer. A wide variety of metallic flake pigments or blend of these pigments can be used, for example, aluminum flake, bronze flake, zinc flake, magnesium flake, copper flake, gold flake, silver flake, platinum flake, and the like. One preferred metallic flake is aluminum flake. To prevent discoloration and corrosion of the flake and increase the dispersability of the flake, the flake is coated with a cross-linked polymer. A variety of polymers can be used such as, acrylic polymers, polyesters, alkyd resins, polyurethanes and epoxy resins. However, the polymer of the flake must be cross-linked and any of the aforementioned thermosetting resins which are compatible with the polymer used to coat the resin can be used or for example, a polyfunctional monomer can be incorporated into the polymer which will cross-link the polymer.

One preferred coated flake used in this invention is an aluminum flake coated with a thin layer of a polymer of methyl methacrylate/alkylene glycol dimethacrylate/methacrylic acid.

The coated metallic flake is blended with the aforementioned polymer solution of the acid containing polymer and the thermosetting resin. This can be done by several techniques. The preferred technique is to sand-grind the metallic flake with the aforementioned polymer solution until the flake is thoroughly dispersed in the polymer solution and completely coated with polymer.

It is important that the metallic flake particles be completely coated with the acid containing polymer to completely disperse the metallic flake particles in the aqueous electrocoating bath. If this is not accomplished, the metallic flake pigment will rapidly settle out of the dispersion and will not be electrodeposited uniformly.

To disperse the film-forming components in an aqueous bath the acidic polymer must be neutralized with a water-soluble basic compound. Neutralization can be accomplished by blending the water-soluble basic compound with the film-forming polymer as it is being blended with the coated metallic flake pigment or after the coated metallic flake pigment has been blended with the polymer. Preferably, the water-soluble basic compound metallic flake and acidic film-forming polymer are charged into a sand mill and ground until the metallic flake is thoroughly dispersed. Preferably, the acidic polymer neutralized to a pH of about 5–10, and more preferably, to a pH of about 7–8.5. After the pigment has been dispersed in the polymer and the polymer has been neutralized, water is then slowly added to the dispersion of film-forming polymer and metallic flake to give an electrocoating composition that has a solids content of about 2–35 percent, and preferably, about 5–15 percent by weight of film-forming components.

Other techniques can be used to disperse the film-forming components in the aqueous system, however, the aforementioned technique has been found quite useful.

The water-soluble basic compounds which are particularly suitable for forming electrocoating compositions useful in this invention and in adjusting the pH of the composition to the aforementioned range are, for example, ammonia, primary amines, secondary amines, tertiary amines, polyamines, hydroxy amines, water-soluble metal hydroxides. The following are examples of these compounds: ethanolamine, diethanolamine, triethanolamine, n-methylethanolamine, N-aminoethylethanolamine, n-methyldiethanolamine, monoisopropylolamine, diisopropylolamine, triisopropylolamine, hydroxyamine, butanolamine, hexanolamine, methyldiethanolamine, sodium hydroxide, potassium hydroxide, lithium hydroxide, ethylene diamine, diethylene triamine, diethylene tetramine, hexamethylene tetramine, tetraethylene diamine, propylenediamine, 1,3-diaminopropane, diamino-bispropylamine, mono, di and trialkyl amines, in which the alkyl groups have one to eight carbon atoms. The reaction products of an alkylene oxide and polyamine can also be used. One preferred compound is triethylamine.

Other pigments can be added to the polymer dispersion used in the novel process of this invention. These pigments can often be added to give the metallic flake the desired color. Color pigments, dyes and lakes such as iron blues, organic reds, maroons and the like can be added.

In a typical electrocoating process, the article to be electrocoated is positioned in a conventional electrocoating cell and forms the anode of the electrocoating cell. An electric current is passed through the cell and the negatively charged film-forming polymer particles and metallic flake particles coated with these film-forming polymer particles are simultaneously deposited on the anode. When the coating reaches the desired thickness, the article is removed from the bath, washed with water and baked at about 200°–400° F. for about 10–30 minutes to give a hard, durable coating.

The current density used in an electrocoating cell generally does not exceed 0.3 amperes/square inch of anode surface which is immersed in the bath and it is preferable to use less. Voltages of about 50–500 volts can be used, but voltages of about 150–300 are preferred.

A dialysis membrane or an ion exchange membrane can be used in the novel process of this invention to remove unwanted products which may be present in the electrocoating composition. These unwanted products in the electrocoating bath result from the addition of water, entrainment of salts on work pieces, excess amine or other neutralization agents which result from the deposition of the anionic polymer and the like. These unwanted byproducts accumulate in the bath and if not removed, cause poor quality films and instability of the bath. Typically useful electrodialysis membranes are disclosed in Gilchrist U.S. Pat. No. 3,304,250, issued Feb. 14, 1967, and useful ion-exchange membranes are disclosed in Cooke U.S. Pat. No. 3,419,488, issued Dec. 31, 1968. Both of these patents are hereby incorporated by reference.

These membranes ma be positioned in the electrocoating cell and the cell is adapted so that impurities may be removed as shown in the above patents. Another method is to place the membrane in a separate unit and pass the electrocoating composition through the unit to remove impurities and recycle the electrocoating composition into the bath.

The ion-exchange membrane is preferred, particularly those membranes disclosed in columns 2 and 3 of Cooke U.S. Pat. No. 3,419,488. These ion-exchange membranes maintain closer control of pH and selectively remove unwanted cationic byproducts which degrade the electrodeposited film and the bath.

The examples which follow will illustrate the invention. Quantities are on a weight basis unless otherwise indicated.

Example I

The following electrocoating composition is formed by blending the following ingredients;

| | Parts by Weight |
|---|---|
| Portion 1 | |
| Acrylic polymer solution (50 percent polymer solids in isoproponal wherein the polymer is of styreme/methyl methacrylate/2-ethyl-hexylacrylate/hydroxypropyl methacrylate/methacrylic acid, weight ratio 20/20/45/10/5 and has an acid number of about 33 ) | 180.0 |
| Triethylamine | 2.6 |
| Coated aluminum flake (aluminum flake has a diameter-thickness ratio of 40:1 to 100:1 prepared below) | 4.5 |
| Portion 2 | |
| Water | 712.9 |
| Total | 900.0 |

Portion 1 is charged into a conventional sand-grinding mill and ground until complete dispersion of the flakes is obtained. Then portion 2 is slowly added with constant agitation. The resulting dispersion has a pH of about 8.2, a polymer solids content of 10 percent and a pigment to binder ratio of 2:100.

The coated aluminum flake is prepared by charging 100 parts of an aluminum flake paste having a 65 percent solids content of flake having a diameter to thickness ratio indicated above into a vessel equipped with a stirrer and condenser along with 500 parts of hexane and 0.5 parts of azobisisobutyronitrile. The mixture is slowly heated with constant stirring to about 67 percent C. The following monomer blend is prepared and slowly added over 1 hour to the above mixture. The monomer blend is of 64.0 parts methyl methacrylate monomer, 3.0 parts of ethylene glycol dimethacrylate monomer and 2.0 parts of methacrylic acid monomer. After the monomer blend is added, the mixture is held at its reflux temperature for 2 hours and then 0.5 parts of a catalyst of 70 percent tertiary butyl perprivalate in mineral spirits is added. The reaction is continued at the reflux temperature for 3 hours. After the mixture is cooled, the coated aluminum flake is filtered from the solvent.

A steel plate about 2×6×1/32 inch is treated on both sides with "Bonderite" 1,000 which is believed to be essentially an aqueous solution of dilute phosphoric acid. The phosphoric acid etches the metal and deposits about 50 milligrams of iron phosphate per square foot of steel plate. Treated steel plates are then washed with water and dried.

A galvanized tank having about a 700-millimeter capacity is filled with electrocoating composition prepared above. A steel panel treated as above is positioned in about the center of the tank and forms the anode of the electrocoating cell, while the tank itself forms the cathode of the cell. A DC voltage of about 250 volts is applied to this cell for about 3 minutes. A 0.8-mil-thick film of coating is deposited on each side of the steel plate. The coating has excellent adherence to the phosphatized steel substrate. The coated steel plate is washed and dried and baked at about 350° F. for 30 minutes. The resulting coating on the steel plate is a smooth glossy, tough film which has an exceptionally attractive appearance provided by the metal flake.

EXAMPLE 2

An electrocoating composition is formed by blending the following ingredients:

| | Parts by Weight |
|---|---|
| Acrylic polymer solution (described in Example 1) | 160.0 |
| Triethylamine | 2.3 |
| Coated aluminum flake (described in example 1) | 4.0 |
| XM-1116-melamine formaldehyde cross-linked resin (tetrakisethoxymethyl bismethoxymethyl melamine) | 16.0 |
| Total | 182.3 |

The above composition is charged into a conventional sand-grinding mill and ground until complete dispersion of the flake is obtained. An electrocoating dispersion is formed by taking 133.0 parts by weight of the above composition and blending this with 597 parts by weight of water. The resulting dispersion has a polymer solids content of 9.5, a pH of 8.2 and a pigment to binder ratio of about 2:100.

Steel panels primed as in example 1 are electrocoated with the above prepared composition using the same procedure as in example 1. The coated plates are washed, dried and baked as in example 1 giving a coating about 0.8-mil thick that is smooth, tough and has excellent adherence to the substrate and has an attractive appearance provided by the metal flake.

The above electrocoating dispersion is allowed to stand for 72 hours. The aluminum flake settled to the bottom of the electrocoating tank but is readily redispersed by agitating the dispersion in the tank.

EXAMPLE 3

An electrocoating composition is formed by blending the following ingredients:

|  | Parts by Weight |
|---|---|
| Alkyd polymer solution (63 percent polymer solids in diacetone alcohol in which the polymer is hydrogenated bisphenol A/dehydrated castor oil/1,5-pentane diol/trimellitic anhydride in a weight ratio of 35.8/23.9/15.5/24.8 and has an acid number of 23) | 200.0 |
| Diethanolamine | 4.5 |
| XM-1116 (tetrakisethoxymethyl-bismethoxymethyl melamine) | 27.0 |
| Titanium dioxide pigment | 12.6 |
| Monastral green pigment | 7.5 |
| Coated aluminum flake (described in Example 1) | 10.0 |
| Total | 261.6 |

The above composition is charged into a conventional sand-grinding mill and ground until all of the pigment is dispersed. An electrocoating dispersion is formed by taking 119.7 parts by weight of the above composition and blending this with 700 parts by weight of water. The resulting dispersion has a polymer solids content of 9 percent, a pH of about 8.0 and a total pigment (i.e., inorganic and metallic flake) to binder ratio of about 16:100.

Steel panels primed as in example 1 are electrocoated with the above prepared composition using the same procedure as in example 1. The coated plates are washed, dried and baked as in example 1 giving a coating about 0.9-mil thick that is smooth, tough and has excellent adherence to the substrate and has an attractive metallic green coating.

What is claimed is:

1. In the process for electrocoating a film-forming polymer composition on the anode of an electrocoating cell, said anode consisting of a metal article, by immersing said anode in a bath containing a polymeric dispersion, passing direct current through said cell to deposit a coating on the anode, removing the coated anode from the bath and baking the coated anode to form a continuous film thereon, the improvement therewith comprising a coating bath of an aqueous dispersion having a polymer solids content of 2–35 percent by weight and having a pH of about 5–10 comprising 1. uniformly dispersed film-forming components comprising a polymer having pendent acid groups and having an acid number of about 0.5–300; the film-forming polymer being neutralized with a water-soluble compound selected from the group consisting of metal hydroxide, a water-soluble amine, a water-soluble polyamine, and a water-soluble hydroxyamine;

2. uniformly dispersed pigment particles of metallic flake pigment coated with a thin layer of a cross-linked polymer and said flake having a diameter of thickness ratio of about 40:1 to about 1000:1, wherein the metallic flake pigment is in a pigment to binder ratio of about 1:100 to about 10:100.

2. The process of claim 1 in which the coating bath has a pH of about 7–9 and consists essentially of an aqueous dispersion in which the film-forming components consists essentially of A. about 95–50 percent by weight of the total weight of the film-forming components of a polymer having an acid number of about 0.5–25 and correspondingly, B. about 5–50 percent by weight of a water-dispersible thermosetting resin.

3. The process of claim 2 in which the coating is an aqueous dispersion of an acrylic polymer and the thermosetting resin is a melamine deriative.

4. The process of claim 3 in which the acrylic polymer consists essentially of an alkyl methacrylate, an alkyl acrylate, a hydroxy containing compound selected from the group consisting of a hydroxyalkyl acrylate and a hydroxyalkyl methacrylate, and an α,β-unsaturated monocarboxylic acid.

5. the process of claim 3 in which the acrylic polymer consists essentially of styrene, methyl methacrylate, 2-ethylhexylacrylate, hydroxypropyl methacrylate and methacrylic acid and the melamine derivative is tetrakis-ethoxylmethyl-bismethoxymethyl melamine and the metallic flake is an aluminum flake coated with a cross-linked acrylic polymer.

6. The process of claim 5 in which the cross-linked polymer on the aluminum flake is methylmethacrylate, alkylene glycol dimethacrylate and methacrylic acid.

7. The process of claim 2 in which the coating is an aqueous dispersion of an alkyd resin and the thermosetting resin is a melamine derivative.

8. The process of claim 7 in which the alkyd resin comprises isopropylidene dicyclohexanol, dehydrated castor oil fatty acids, pentane diol, trimellitic anhydride and the melamine derivative is tetrakisisethoxymethyl-bismethoxymethyl melamine and the metallic flake is an aluminum flake coated with a cross-linked acrylic polymer.

9. The process of claim 8 in which the cross-linked polymer on the aluminum flake is methyl methacrylate ethylene glycol dimethacrylate and methyacrylic acid.

* * * * *